United States Patent
Hayashi et al.

(10) Patent No.: US 7,065,776 B2
(45) Date of Patent: Jun. 20, 2006

(54) OPTICAL DATA RECORDING MEDIUM AND MANUFACTURING METHOD FOR THE SAME, AND A METHOD FOR CLAMPING THE OPTICAL DATA RECORDING MEDIUM

(75) Inventors: Kazuhiro Hayashi, Kadoma (JP); Eiji Ohno, Hirakata (JP); Masanari Mohri, Kobe (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 33 days.

(21) Appl. No.: 10/655,135

(22) Filed: Sep. 5, 2003

(65) Prior Publication Data

US 2004/0136312 A1 Jul. 15, 2004

(30) Foreign Application Priority Data

Sep. 5, 2002 (JP) ............................. 2002-260192
Nov. 1, 2002 (JP) ............................. 2002-320017
Mar. 13, 2003 (JP) ............................. 2003-068752

(51) Int. Cl.
G11B 7/24 (2006.01)

(52) U.S. Cl. .................................................. 720/719

(58) Field of Classification Search ................ 720/718, 720/719, 724; 369/272.1, 275.5, 280, 281, 369/283, 289.1, 291.1, 290.1, 75.11, 75.21, 369/77.11
See application file for complete search history.

(56) References Cited

U.S. PATENT DOCUMENTS

| | | | |
|---|---|---|---|
| 4,351,047 A * | 9/1982 | Redlich et al. .......... 369/270.1 |
| 4,633,458 A * | 12/1986 | Tiefensee ................. 369/275.5 |
| 5,233,597 A * | 8/1993 | Nakayama et al. ....... 369/275.1 |
| 5,544,148 A * | 8/1996 | Nakamichi ............... 369/30.82 |
| 5,987,003 A * | 11/1999 | Yokota ........................ 369/280 |
| 6,077,583 A * | 6/2000 | Park .......................... 428/64.1 |
| 6,532,210 B1 * | 3/2003 | Park ............................ 369/282 |
| 6,667,953 B1 * | 12/2003 | Matson et al. .............. 720/719 |
| 6,680,898 B1 * | 1/2004 | Kuchman ................. 369/275.4 |
| 6,842,409 B1 * | 1/2005 | Kuchman .................. 369/47.1 |
| 6,865,745 B1 * | 3/2005 | Myrtle ........................ 720/724 |
| 2001/0043555 A1 | 11/2001 | Hisada et al. ............... 720/718 |
| 2004/0047280 A1 * | 3/2004 | Lee et al. .................... 369/282 |
| 2005/0050572 A1 * | 3/2005 | An et al. ..................... 720/719 |

FOREIGN PATENT DOCUMENTS

| | | | |
|---|---|---|---|
| JP | 10-106044 A * | 4/1998 |
| JP | 2003-242680 A * | 8/2003 |
| KR | 10-2004-0047424 A * | 6/2004 |

* cited by examiner

OTHER PUBLICATIONS

IBM TDB Jan. 1991, v. 33, No. 8, p. 361.*

*Primary Examiner*—Julie Anne Watko
(74) *Attorney, Agent, or Firm*—Wenderoth, Lind & Ponack, L.L.P.

(57) ABSTRACT

A disc-shaped optical data recording medium has a signal recording layer for reading and/or writing data using light, and a 10 μm to 200 μm thick transparent protective layer disposed over the signal recording layer. The optical data recording medium includes a protrusion projecting from a surface of the transparent protective layer on a light-incidence surface side to which light is emitted to the signal recording layer. The protrusion is disposed in an area between a center hole and a clamping area where the optical data recording medium is held when reading and/or writing data in the signal recording layer.

10 Claims, 15 Drawing Sheets

OPTICAL DATA RECORDING MEDIUM AND MANUFACTURING METHOD FOR THE SAME, AND A METHOD FOR CLAMPING THE OPTICAL DATA RECORDING MEDIUM

BACKGROUND OF THE INVENTION

1. Field of the Invention

The present invention relates to a disc-shaped optical data recording medium having a signal recording layer for recording and/or playing information by emitting a light beam thereto, and a transparent protective layer 10 μm to 200 μm thick disposed over the signal recording layer. The invention also relates to a method for manufacturing this optical data recording medium, and to a method for clamping the optical data recording medium.

2. Description of Related Art

Optical discs are known and widely used as a high capacity data storage medium for high density recording and playback of information using a laser beam. These optical discs are broadly categorized as read-only, incrementally writable (multisession), and rewritable. Typical of read-only discs are Compact Discs (CDs) storing audio content and Laser Discs storing video content such as movies. Both incrementally writable (multisession) and rewritable media are widely used in the computer industry, for example, for storing text documents and still image files.

These optical discs typically have a data layer disposed to one main side of a 1.2 mm thick transparent substrate. A protective overcoat is then applied to the data layer, or a protective disc identical to the transparent substrate is bonded by adhesive to the data layer. See, for example, Japanese Laid-Open Patent Publication No. 2001-093193, paragraph [0015] and FIG. 1, and Japanese Laid-open Patent Publication No. 2002-042376, paragraph [0019] and FIG. 1.

Development and introduction of Digital Versatile Discs (DVD), a high capacity optical disc medium, has made it practical for even end-users to record moving picture content (such as movies and video) together with audio to an optical disc. High density media such as DVD have been achieved by using a shorter wavelength laser and an objective lens with a large numeric aperture (NA). However, shortening the beam wavelength and increasing the NA also reduce the tolerance for tilt, the inclination of the disc to the direction of laser beam emission.

Tolerance for tilt can be improved by using a thinner substrate. With DVD media this means, for example, using a 0.6 mm thick substrate assuming a 650 nm laser and 0.60 NA. Because a 0.6 mm thick substrate is mechanically weak and would thus increase tilt, DVD discs have two such substrates bonded together with the data recording surfaces on the inside between the substrates.

By using this laminated structure a transparent reflective layer of gold or silicon, for example, is formed on the data recording surface of one of the two substrates, and a conventional reflective layer of aluminum, for example, is formed on the data recording surface of the other substrate. The substrates are then bonded together with these data recording surfaces facing each other on the inside, resulting in a single-sided, double-layer DVD that can be read from one side of the disc, that is, from the side of the substrate having the transparent reflective layer over the data recording layer. Rewritable DVD media with a similar double-layer construction are also available, but the data recording surface in this case is a rewritable thin-film recording layer instead of a metal mirror layer.

Using a blue-purple laser with an approximately 400 nm wavelength has also been proposed as a way to achieve even higher recording densities. One method uses an approximately 0.1 mm thick transparent protective layer on the read/write side and forms an ultrafine laser spot using an approximately 0.85 NA lens for signal reading and/or writing. The transparent layer can be formed with the following two methods.

(A) Bonding a transparent substrate slightly less than 0.1 mm thick to the signal surface side of a 1.1 mm thick signal substrate using adhesive.

(B) Coating the signal surface side of a 1.1 mm thick signal substrate with an approximately 0.1 mm thick transparent resin layer.

In method (A) a polycarbonate sheet manufactured by casting, for example, is used as the transparent substrate. Thickness variation in such cast sheets is minimal at approximately +/−1 μm. The thickness of the adhesive used to bond this polycarbonate sheet to the signal substrate is also thin and can be easily formed to a uniform thickness. As a result, a transparent protective layer with uniform thickness can be formed on the recording/playback side of the disc.

With method (B) it is difficult to form a uniformly thick coating because of the thickness of the transparent resin, but a low cost, high density optical disc can be achieved because it is not necessary to use sheets manufactured in a high cost casting process.

SUMMARY OF THE INVENTION

A problem with high density optical discs is that the surface of the transparent protective layer is easily scratched, and scratches can easily cause a loss of servo control. Increasing the mechanical strength of the transparent protective layer itself increases the film thickness, and is not suited for high density recording. It is therefore difficult to protect the surface from scratching while keeping the transparent protective layer thin.

The data transfer rate during recording and playback is higher with high density optical discs than conventional CD and DVD media, and the disc therefore spins faster. Imbalances in the shape and weight of the disc relative to the spindle hole can therefore increase the load on the rotating spindle (motor).

In addition, high speed rotation of these high density optical discs also requires higher disc clamping force than CD and DVD discs.

The present invention is therefore directed to solving these three problems, and an object of the invention is to provide an optical data recording medium having surface protrusions for protecting the transparent protective layer and reducing the load on the motor during disc rotation, and enabling higher disc clamping force to be applied to the optical data recording medium.

To achieve the above objects an optical data recording medium with a signal recording layer for reading and/or writing data using light, and a 10 μm to 200 μm thick transparent protective layer disposed over the signal recording layer, comprises a protrusion projecting from the surface of the transparent protective layer on the light-incidence surface side to which light is emitted to the signal recording layer in an area between a center hole and a clamping area where the optical data recording medium is held when reading and/or writing data in the signal recording layer.

Because this protrusion is on the inside circumference side of the clamping area, the protrusion will not interfere (collide) with the optical head. Furthermore, when the optical data recording medium is placed on a flat surface with the transparent protective layer side facing the flat surface, the protrusion keeps the transparent protective layer off the flat surface and thereby prevents scratching the transparent protective layer.

The load imposed on the rotating spindle (motor) caused by a weight imbalance in the protrusion is also reduced because the protrusion is located near the center spindle hole.

The protrusion is preferably disposed separated at least 0.1 mm in the radial direction from an outside edge of the center hole. This configuration prevents the protrusion from interfering with the center cone used to hold the optical data recording medium at the spindle hole in the disc recording and playback drive, and thereby enables stable clamping of the optical data recording medium.

In another aspect of the invention a disc-shaped optical data recording medium with a signal recording layer for reading and/or writing data using light, and a 10 µm to 200 µm thick transparent protective layer disposed over the signal recording layer, is characterized by having a clamping area on the outside of the center hole in the radial direction for holding the optical data recording medium when reading or recording data in the signal recording layer; a signal area on the outside of the clamping area in the radial direction for recording or reading data in the signal recording layer; and a protrusion projecting from the surface of the transparent protective layer in an area disposed between the clamping area and signal area on the light-incidence side of the signal recording layer to which light is emitted for reading and/or writing information.

When this optical data recording medium is placed on flat surface with the transparent protective layer thereof facing the flat surface, the proximity of the protrusion to the signal area keeps the transparent protective layer separated from the flat surface and thereby provides excellent protection for the transparent protective layer.

Preferably, the protrusion is disposed to an area within 2 mm to the outside in the radial direction from the outside circumference edge of the clamping area.

Interference between the protrusion and the optical head is thus further prevented because the protrusion is sufficiently separated from the signal area.

A disc-shaped optical data recording medium having a signal recording layer for reading and/or writing data using light, and a 10 µm to 200 µm thick transparent protective layer disposed over the signal recording layer, according to a further aspect of the invention is characterized by a clamping area on the outside of the center hole in the radial direction for holding the optical data recording medium when reading or recording the signal recording layer; a signal area on the outside of the clamping area in the radial direction for recording or reading data in the signal recording layer; and a protrusion projecting from the surface of the transparent protective layer in the clamping area on the light-incidence side of the signal recording layer to which light is emitted for reading and/or writing information.

This optical data recording medium is clamped on both sides of the protrusion in the clamping area. There is therefore no interference (collision) with the optical head, and the transparent protective layer will not be scratched when the disc is placed on a flat surface with the transparent protective layer facing said flat surface because the protrusion disposed to the same side of the disc keeps the transparent protective layer raised above the flat surface.

Further, greater clamping force can be applied and the disc can be spun stably, assuring good signal quality. The load imposed on the rotating spindle (motor) caused by a weight imbalance in the protrusion is also reduced because the protrusion is located near the center spindle hole.

Preferably, the protrusion projects to a height of 0.05 mm to 0.5 mm from the surface of the transparent protective layer. The transparent protective layer will therefore not be scratched when the disc is placed on a flat surface with the transparent protective layer facing the flat surface because the protrusion projects sufficiently above the disc surface on the same side to keep the transparent protective layer from contacting the flat surface. Scratch-prevention and cost are further improved if the protrusion height is further preferably 0.1 mm to 0.3 mm from the surface of the transparent protective layer.

Yet further preferably, the wavelength of light for recording or reading information in the signal recording layer is 410 nm or less so that a small beam spot enabling high density recording and playback can be achieved.

Another aspect of the present invention is a manufacturing method for a disc-shaped optical data recording medium having a signal recording layer for reading and/or writing data using light, a 10 µm to 200 µm thick transparent protective layer disposed over the signal recording layer, and a protrusion projecting from the surface of the transparent protective layer on the light-incidence surface side to which light is emitted to the signal recording layer. This manufacturing method has steps for: preparing a first die with a cavity corresponding to the protrusion, and a second die corresponding to the first die; disposing and closing the first die and second die together; injecting resin between the first die and second die; curing the resin to form a resin molding having the protrusion; and opening the first die and second die, and removing the cured resin molding.

In another manufacturing method for a disc-shaped optical data recording medium having a signal recording layer for reading and/or writing data using light, a 10 µm to 200 µm thick transparent protective layer disposed over the signal recording layer, and a protrusion projecting from the surface of the transparent protective layer on the light-incidence surface side to which light is emitted to the signal recording layer, a substrate for the optical data recording medium is formed by injection molding using a die having a cavity corresponding to the protrusion, and the protrusion is simultaneously formed on the substrate.

These manufacturing methods for an optical data recording medium according to the present invention provide a cavity corresponding to the desired shape of the protrusion in a die, and then introduce molten resin to the mold and apply pressure in an injection molding process. This produces a substrate with a signal pattern transferred from the stamper in the mold and a protrusion simultaneously formed to the substrate surface, thereby improving mass production of the optical data recording medium.

In another aspect of a manufacturing method for a disc-shaped optical data recording medium having a signal recording layer for reading and/or writing data using light, a 10 µm to 200 µm thick transparent protective layer disposed over the signal recording layer, and a protrusion projecting from the surface of the transparent protective layer on the light-incidence surface side to which light is emitted to the signal recording layer, the protrusion is formed on the optical data recording medium by bonding thereto a part in the shape of the protrusion.

By thus bonding parts forming the desired shape of the protrusion to the disc surface, this optical data recording medium manufacturing method can easily form the protrusion at a desired location on the disc, thereby improving mass production.

In another aspect of a manufacturing method for a disc-shaped optical data recording medium having a signal recording layer for reading and/or writing data using light, a 10 μm to 200 μm thick transparent protective layer disposed over the signal recording layer, and a protrusion projecting from the surface of the transparent protective layer on the light-incidence surface side to which light is emitted to the signal recording layer, the protrusion is formed on the optical data recording medium by dripping a liquid material onto the optical data recording medium and curing the liquid material in the shape of the protrusion.

This manufacturing method can easily produce protrusions of the desired shape at the desired location of the disc surface by simply changing how the liquid material is dripped onto the substrate. Little time is also needed to form the protrusions, and optical data recording media having protrusions according to the present invention can therefore be manufactured at low cost.

In another aspect of a manufacturing method for a disc-shaped optical data recording medium having a signal recording layer for reading and/or writing data using light, a 10 μm to 200 μm thick transparent protective layer disposed over the signal recording layer, and a protrusion projecting from the surface of the transparent protective layer on the light-incidence surface side to which light is emitted to the signal recording layer, the protrusion is formed on the optical data recording medium by a screen printing process using a screen having the desired shape of the protrusion.

This manufacturing method can easily produce protrusions of the desired shape at the desired location of the disc surface by simply changing the pattern of the protrusions in the screen. Little time is therefore needed to form the protrusions, and optical data recording media having protrusions according to the present invention can therefore be manufactured at low cost.

The material used to make the parts bonded to the optical data recording medium surface, and the material of the protrusions formed by screen printing, in the optical data recording medium manufacturing methods described above is preferably a resin. This makes materials handling simple, enables using low cost materials, and improved productivity. The resin is further preferably a UV-cure resin, a thermo-setting resin, or a pressure-sensitive adhesive. Each of these materials is inexpensive and easily procured.

Further preferably, the protrusion is disposed in an area between the center hole and a clamping area where the optical data recording medium is held for reading and/or writing data in the signal recording layer.

This configuration locates the protrusion on the optical data recording medium surface on the inside circumference side of the clamping area. The protrusion therefore does not interfere (collide) with the optical head, and the transparent protective layer will not be scratched when the disc is placed on a flat surface with the transparent protective layer facing said flat surface because the protrusion disposed to the same side of the disc prevents the transparent protective layer from touching the flat surface. Disc reliability can therefore be assured for a long time.

Yet further preferably, the protrusion is disposed in an area between the clamping area for holding the optical data recording medium when reading or recording data in the signal recording layer, and the signal area for recording or reading data in the signal recording layer.

Yet further preferably, the protrusion is disposed to an area within 2 mm to the outside in the radial direction from the outside circumference edge of the clamping area. In this case the optical data recording medium assures no interference between the protrusion and optical head regardless of the recording and playback device in which it is used.

Yet further preferably, the protrusion is disposed in the clamping area for holding the optical data recording medium when reading or recording data in the signal recording layer.

Because the disc in this case is clamped on both sides of the protrusion, the protrusion is prevented from interfering with the optical head while also protecting the transparent protective layer. Greater clamping force can also be applied to the optical data recording medium.

Yet further preferably, the protrusion is formed to a height of 0.05 mm to 0.5 mm from the surface of the transparent protective layer. Because the protrusion thus projects sufficiently from the transparent protective layer surface with this configuration, the transparent protective layer will not be scratched when the disc is placed on a flat surface because the transparent protective layer is prevented from touching said flat surface by the protrusion. A more dependable optical data recording medium can therefore be manufactured.

Scratch-prevention and cost are further improved if the protrusion height is further preferably 0.1 mm to 0.3 mm from the surface of the transparent protective layer.

Another aspect of the present invention is a clamping method for a disc-shaped optical data recording medium having a signal recording layer for reading and/or writing data by emitting light using an optical head with a 0.7 to 0.9 numeric aperture, and a 10 μm to 200 μm thick transparent protective layer disposed over the signal recording layer. The optical data recording medium has a clamping area on the outside of the center hole in the radial direction for holding the optical data recording medium when reading or recording data in the signal recording layer, a signal area on the outside of the clamping area in the radial direction for recording or reading data in the signal recording layer, and a protrusion projecting from the surface of the transparent protective layer in the clamping area on the light-incidence side of the signal recording layer to which light is emitted for reading and/or writing information. The clamping method holds the optical data recording medium on both sides of the protrusion when recording or reading data in the signal recording layer of the optical data recording medium.

By holding the optical data recording medium on both sides of the protrusion, this disc clamping method can apply greater clamping force, the disc can be spun stably, and good signal quality can be achieved.

Preferably, the area for clamping on both sides of the protrusion on the light incidence side is in a radial area with a radius of 11 mm to 16.5 mm.

Yet further preferably, the optical data recording medium is clamped by both holding the optical data recording medium on both sides of the protrusion on the light incidence side and holding the protrusion.

By thus clamping the disc in two areas on opposite sides of the protrusion and by applying pressure directly to the protrusion, even greater clamping force can be applied.

With an optical data recording medium according to the present invention the protrusion will not interfere (collide) with the optical head and the transparent protective layer is protected from scratches when the disc is placed transparent protective layer-side down on a flat surface because the protrusion prevents the transparent protective layer from touching the flat surface.

Furthermore, the load on the rotating spindle (motor) caused by a weight imbalance in the protrusion is also reduced because the protrusion is located near the center spindle hole.

The clamping method of an optical data recording medium according to the present invention holds the optical data recording medium in a clamping area on either or both sides of the protrusion. The optical data recording medium can therefore be held and spun stably during recording and playback, assuring consistent recording and playback and good signal quality.

The optical data recording medium manufacturing method of this invention can also easily form the protrusion, thus improving optical data recording medium productivity.

Other objects and attainments together with a fuller understanding of the invention will become apparent and appreciated by referring to the following description and claims taken in conjunction with the accompanying drawings.

BRIEF DESCRIPTION OF THE DRAWINGS

The present invention will become readily understood from the following description of preferred embodiments thereof made with reference to the accompanying drawings, in which like parts are designated by like reference numeral, and in which.

DESCRIPTION OF THE PREFERRED EMBODIMENTS

Preferred embodiments of the present invention are described below with reference to the accompanying figures.

Embodiment 1

Figure 1A:
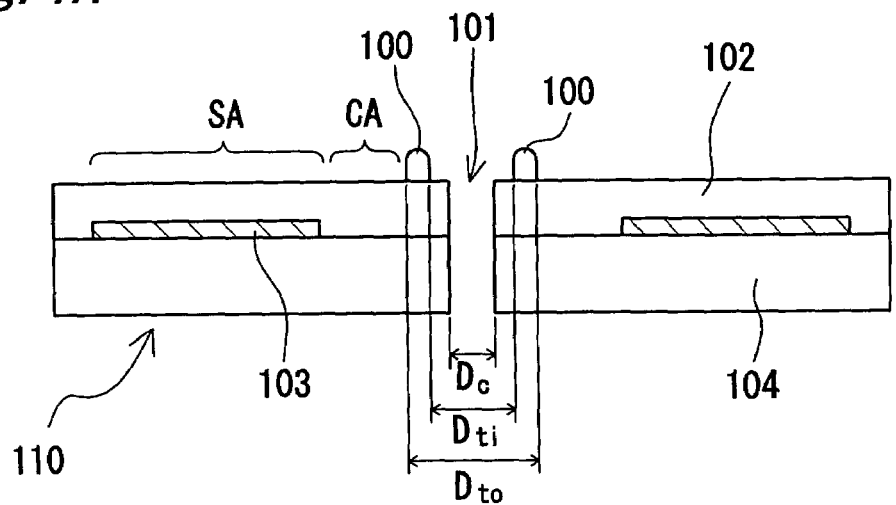
FIG. 1A is a section view of an optical data recording medium having a protrusion according to a first embodiment of the present invention.
Figure 1B:
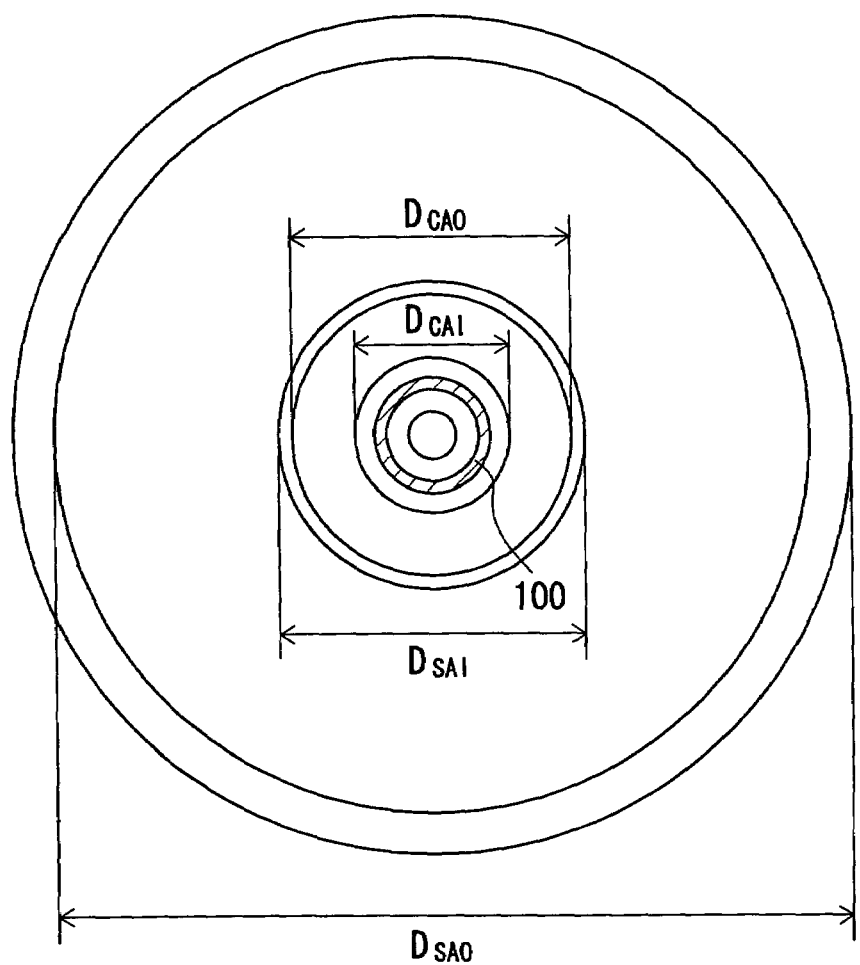
FIG. 1B is a plan view of the same disc.
Figure 2A:
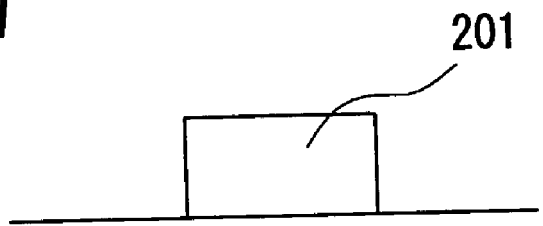
FIG. 2A to FIG. 2E are partial section views of possible protrusion shapes.
Figure 2B:
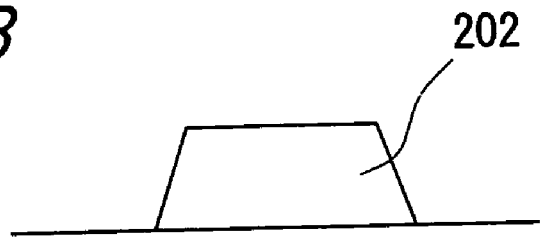
Figure 2C:
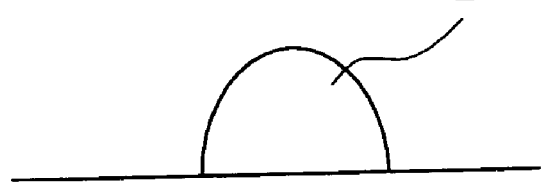
Figure 2D:
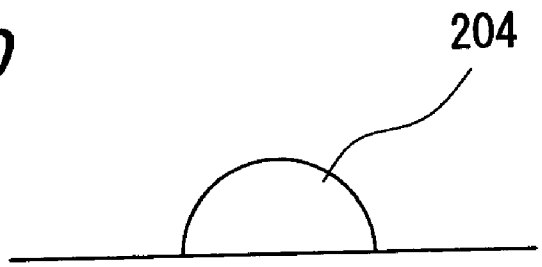
Figure 2E:
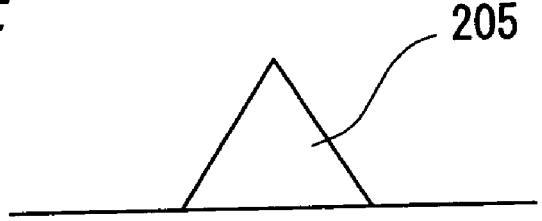

FIG. 1A is a side section view of a preferred embodiment of an optical data recording medium according to the present invention. The optical data recording medium 110 (also referred to below as simply "disc") shown in FIG. 1A has a protrusion 100 disposed on the surface thereof between the inside circumference side of the clamping area CA and the outside edge of the spindle hole 101. FIG. 1A is a section view of this optical data recording medium 110, and FIG. 1B is a top plan view of the optical data recording medium 110.

The outside diameter of this optical data recording medium 110 is 120 mm. The clamping area CA is the area where the optical data recording medium 110 is clamped and held when reading and/or writing data to the signal recording layer 103. The inside diameter $D_{CAI}$ of the clamping area CA is 22 mm and the outside diameter $D_{CAO}$ is 33 mm.

A transparent protective layer 102 protects the signal recording layer 103. A light beam with a 405 nm wavelength, for example, is emitted from an optical head through the transparent protective layer 102 and focused on the signal recording layer 103 for reading and/or writing data.

The transparent protective layer 102 is, for example, 100 μm thick. The signal recording layer 103 is formed over signal pits or grooves that are formed in the signal area SA of the signal substrate 104. The inside diameter $D_{SAI}$ of the signal area SA is 42 mm and the outside diameter $D_{SAO}$ is 119 mm. The signal recording layer 103 could be a multi-layer film including a GeSbTe phase-change film, a multi-layer film including a pigment film, or a metal alloy thin film.

The diameter Dc of the spindle hole 101 is 15 mm. The inside diameter $D_{ti}$ of the protrusion 100 is 18 mm, the width in the radial direction (radial width) is 1 mm, and the height of the protrusion 100 above the surface of transparent protective layer 102 is 0.3 mm. The radial width of the protrusion 100 is preferably 0.2 mm to 1 mm. A width of 0.2 mm or greater is preferred to assure sufficient mechanical strength.

The height of the protrusion 100 from the surface of transparent protective layer 102 is preferably 0.1 mm to 0.5 mm. If the height of the protrusion 100 is at least 0.1 mm above the surface of the transparent protective layer 102 and the transparent protective layer 102 is placed on a flat surface with the protrusion 100 facing down, the transparent protective layer 102 will not contact the flat surface and will be protected from scratching.

Furthermore, while the inside diameter $D_{fi}$ of the protrusion 100 is 18 mm, the inside edge of the protrusion 100 must only be separated at least 0.1 mm from the outside edge of the spindle hole 101. In other words, the inside diameter of protrusion 100 must be greater than diameter ($D_C$+0.2) mm and the outside diameter must be less than inside diameter $D_{CAI}$ of the clamping area CA. If inside diameter $D_{fi}$ is greater than ($D_C$+0.2) mm, the disc can be stably clamped and spun, assuring good signal quality, during recording and playback without interference between the centering cone of the recorder or playback device and the protrusion 100.

Table 1 shows the effect of the protrusion 100 at different elevations from the surface of the transparent protective layer 102. The indices used to evaluate the effectiveness of the protrusion 100 were the amount of scratching on the surface of the transparent protective layer 102, and the ease with which the disc 110 can be picked up, when placed with the transparent protective layer 102 face down against a flat surface.

TABLE 1

Protrusion height and effect

| | Height (mm) of protrusion from transparent protective layer surface | | | | | | |
|---|---|---|---|---|---|---|---|
| | 0 | 0.05 | 0.1 | 0.2 | 0.3 | 0.4 | 0.5 |
| Surface scratching | NG | Some | OK | OK | OK | OK | None |
| Ease of pickup | NG | Poor | Poor | Good | Good | Very good | Very good |

When the height of the protrusion 100 is 0 mm from the surface of the transparent protective layer 102, that is, when there is no protrusion 100, there is excessive scratching of the transparent protective layer and it is difficult to pick the disc up off a flat surface. While a protrusion height of only 0.05 mm provides a slight improvement in scratching and ease of picking up the disc, the protective margin is still not sufficient and the surface of the transparent protective layer must be treated in some way, such as by hardening, to improve scratch resistance.

A protrusion height of 0.1 mm provides a significant improvement in scratching, that is, there is substantially no scratching. When the protrusion height is 0.2 mm to 0.3 mm there is essentially no scratching of the transparent protective layer and the disc is easy to pick up.

When the protrusion height is 0.4 mm there is essentially no scratching of the transparent protective layer and the disc is very easy to pick up. With a protrusion height of 0.5 mm no scratches were found in the transparent protective layer surface and the disc was very easy to pick up.

Increasing the height of the protrusion 100 to greater than 0.5 mm above the surface of the transparent protective layer does not yield any improvement in scratch protection or ease of picking the disc up. Furthermore, a height greater than 0.5 mm increases the amount and therefore the cost of the required materials, and is therefore not desirable.

It should be noted that if the diameter $D_C$ of spindle hole 101 is approximately 15 mm, the diameter of the protrusion 100 is between 17.5 mm to 22 mm, and the height of the protrusion 100 from the surface of transparent protective layer 102 is 0.3 mm or less, the three benefits described below, which include the effects noted above, can be achieved. (Note that (2) and (3) below are the effects described above.)

(1) The protrusion 100 does not interfere with the chuck used to clamp the disc during recording and playback of the optical disc.

(2) Scratches in the transparent protective layer 102 can be prevented whether the disc is warped or placed on a flat surface.

(3) The disc can be easily picked up from a flat surface even if the disc is warped.

Figure 12A:
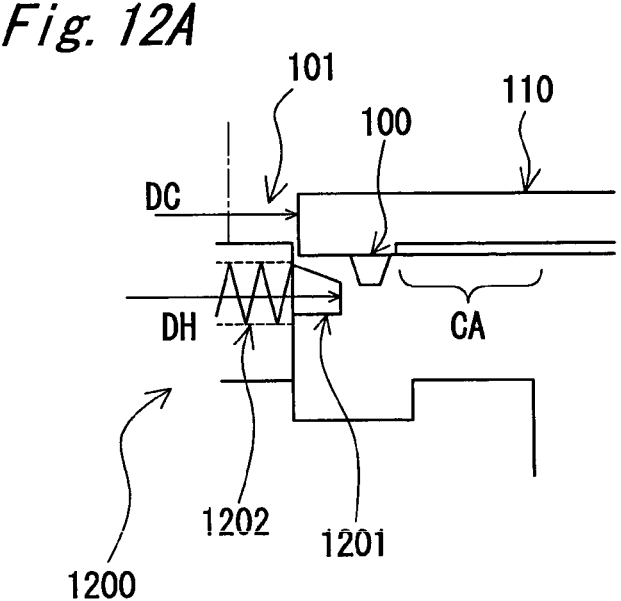
FIG. 12A to FIG. 12C are partial section views of chucking the optical data recording medium for reading and/or writing data to the data recording layer.
Figure 12B:
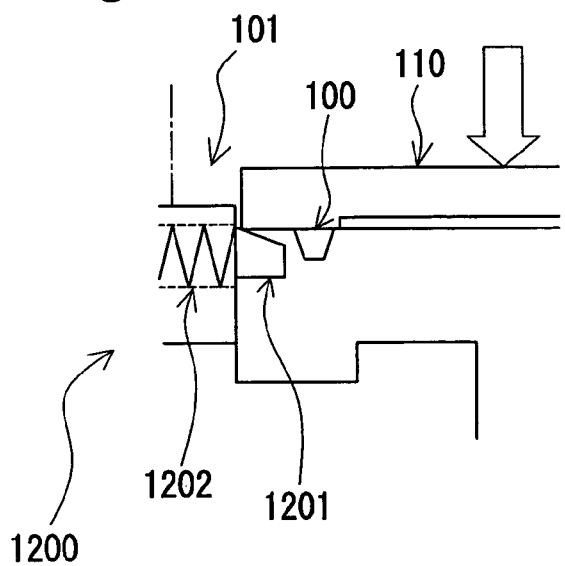
Figure 12C:
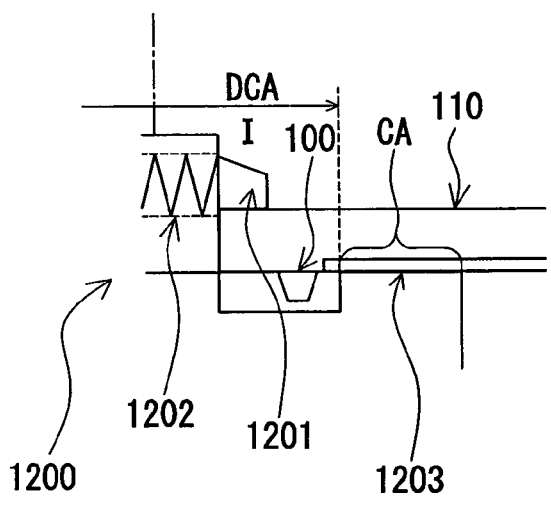

Item (1) above is described first. FIG. 12A to FIG. 12C show chucking the optical data recording medium for recording or playing the disc. FIGS. 12A–12C show a simple, common chucking method such as used with DVD and other media. As shown in FIG. 12A the optical data recording medium 110 is loaded above the chuck 1200. The jaws 1201 of the chuck are extended outward by a spring 1202. If the diameter $D_C$ of spindle hole 101 in optical data recording medium 110 is 15 mm, the jaws 1201 have an outside diameter DH of approximately 17 mm to ensure that the circumference of the spindle hole 101 is firmly chucked. A diameter DH of 17 mm also assures sufficient mechanical strength in the jaws 1201.

As shown in FIG. 12B, the optical data recording medium 110 and the jaws 1201 touch. If the protrusion 100 is disposed to an area outside the 17.5 mm or greater diameter area at the disc center, the protrusion 100 will be beyond the reach of the jaws 1201. There will therefore be no contact between the protrusion 100 and jaws 1201, and no load will be applied to the protrusion 100 and jaws 1201. When pressure is then applied to the top of the disc so as to push it downward, the springs 1202 are forced to contract and the jaws 1201 move inward toward the center of the chuck 1200 until the jaws 1201 pass through the spindle hole 101 of the disc. The springs 1202 then expand outward, pushing the jaws 1201 out.

This results in the optical data recording medium 110 being clamped by the chuck 1200 as shown in FIG. 12C. As shown in FIGS. 1A and 1B, the inside diameter $D_{CAI}$ of the clamping area CA is 22 mm. The chuck 1200 therefore holds the disc 110 in the area outside this inside diameter $D_{CAI}$, but there is no interference between the protrusion 100 and chucking surface 1203 because the outside diameter of protrusion 100 is less than 22 mm.

Furthermore, because the inside diameter of the clamping area in a conventional optical disc such as DVD media is also 22 mm, interference between the protrusion 100 and the jaws and chucking surface of the chuck can be prevented even if the optical data recording medium 110 is accidentally chucked using a chuck for conventional DVD media.

If the protrusion 100 is located in a circumferential band with a 17.5 mm inside diameter and 22 mm outside diameter when the diameter $D_C$ of the spindle hole 101 is approximately 15 mm, it is therefore possible to avoid interference between the protrusion 100 and chuck 1200, including the jaws 1201, even when using a simple chuck 1200 of the type that applies the greatest chucking force to the optical data recording medium 110.

Items (2) and (3) are described above with reference to Table 1, and are described in further detail below with reference to FIG. 13. If the thickness of the transparent protective layer 102 is 100 μm, the maximum deflection allowed in the optical data recording medium 110 is 0.35 degree. This is because if disc warpage exceeds 0.35 degree the error rate during recording and playback rises to a level at which error correction is not possible.

Figure 13:
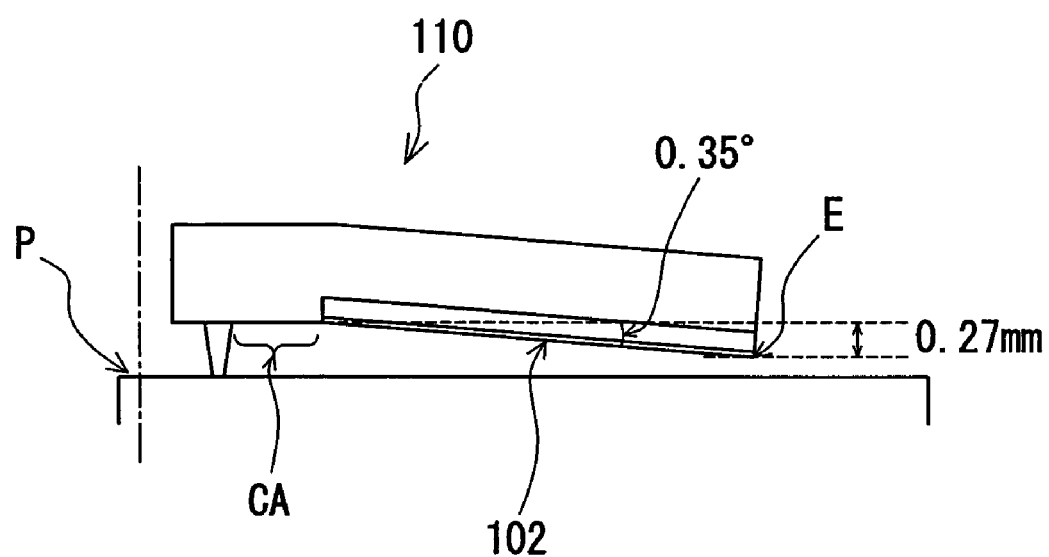
FIG. 13 is a partial section view showing a warped optical data recording medium placed on a flat surface.

FIG. 13 shows an optical data recording medium 110 with the maximum allowable warpage of 0.35 degree when placed on flat surface P with the transparent protective layer 102 facing surface P. The optical data recording medium 110 generally warps on the outside circumference side of the clamping area CA (that is, outside the 33 mm diameter center area of the disc). If the optical data recording medium 110 in this case has the protrusion 100 disposed in the circumferential region with a 17.5 mm inside diameter and 22 mm outside diameter, and the height of the protrusion 100 from the surface of the transparent protective layer 102 is 0.3 mm, there is no contact between the outside edge E of the optical data recording medium 110 and surface P. That is, because the outside diameter of optical data recording medium 110 is 120 mm, (60−33/2)*TAN(0.35 deg)=0.27 mm. The optical data recording medium 110 is therefore this much closer to the surface P, but if the top of the protrusion 100 is 0.3 mm above the surface of transparent protective layer 102, outside edge E will not touch surface P.

When someone then attempts to pick up the disc 110, the increased contact area between the fingers and the outside edge E of the disc 110 makes it easier to pick the disc 110 up.

The surface of the transparent protective layer 102 is also protected from scratches due to contact with the surface P because it does not touch the surface P.

The height of the protrusion 100 above the surface of the transparent protective layer 102 can be determined according to the warpage allowed in the optical data recording medium 110. When the maximum allowed warpage in the optical data recording medium 110 is 0.35 degree as in this example, however, a protrusion height of 0.3 mm or less above the surface of the transparent protective layer 102 is sufficient to achieve the benefits described above.

Figure 14A:
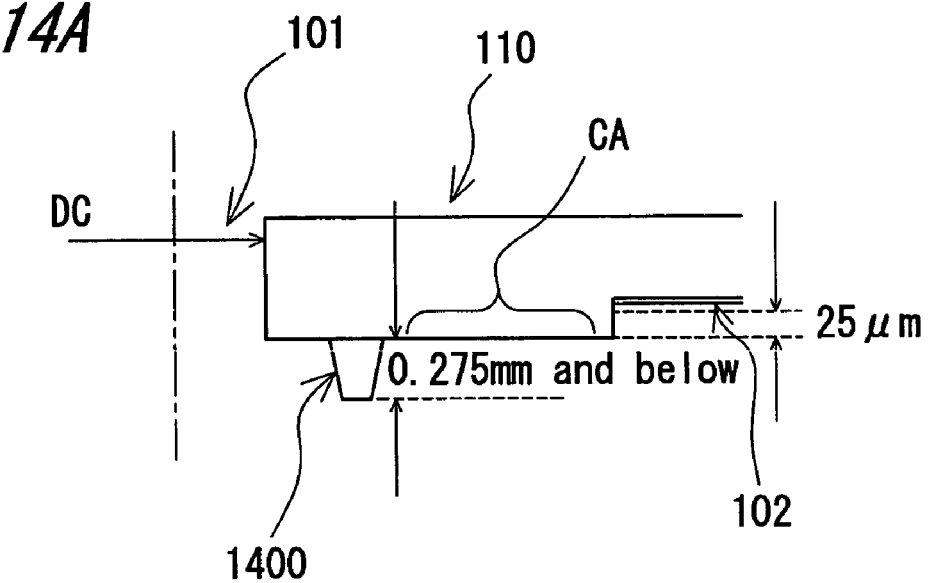
FIG. 14A and FIG. 14B show examples of an optical data recording medium having a difference in the surface elevation of the transparent protective layer and the clamping area CA.
Figure 14B:
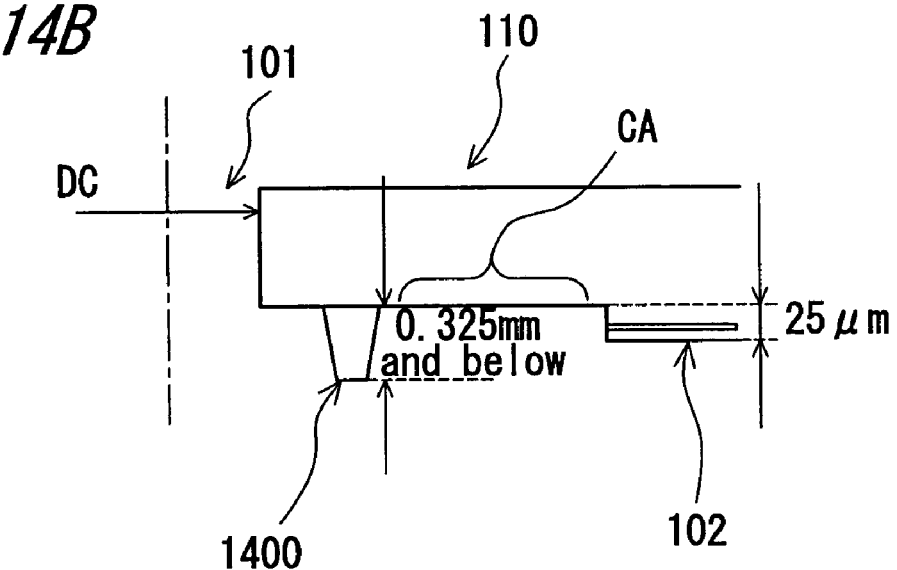

FIG. 14A and FIG. 14B show an alternative case in which there is a difference between the surface elevation of transparent protective layer 102 and the surface elevation of the clamping area CA. FIG. 14A shows an example of an optical data recording medium in which the surface of the transparent protective layer 102 is recessed 25 μm from the surface of clamping area CA so that the transparent protective layer 102 is farther from the recording/playback head than the clamping area CA. FIG. 14B shows a different example in which the surface of the clamping area CA is recessed 25 μm from the surface of clamping area CA so that the surface of the clamping area CA is farther from the recording/playback head.

To assure that the height of protrusion 1400 from the surface of the transparent protective layer 102 is 0.3 mm or less as shown in FIGS. 12A–12C, the height of the protrusion 1400 from the surface of the clamping area CA is controlled to 0.275 mm or less in the case shown in FIG. 14A. To likewise assure that the height of protrusion 1400 from the surface of the transparent protective layer 102 is 0.3 mm or less in the case shown in FIG. 14B, the height of protrusion 1400 from the surface of the clamping area CA is controlled to 0.325 mm or less. This assures in both cases that the height of the protrusion 1400 from the surface of the transparent protective layer 102 is 0.3 mm or less.

Figure 15:
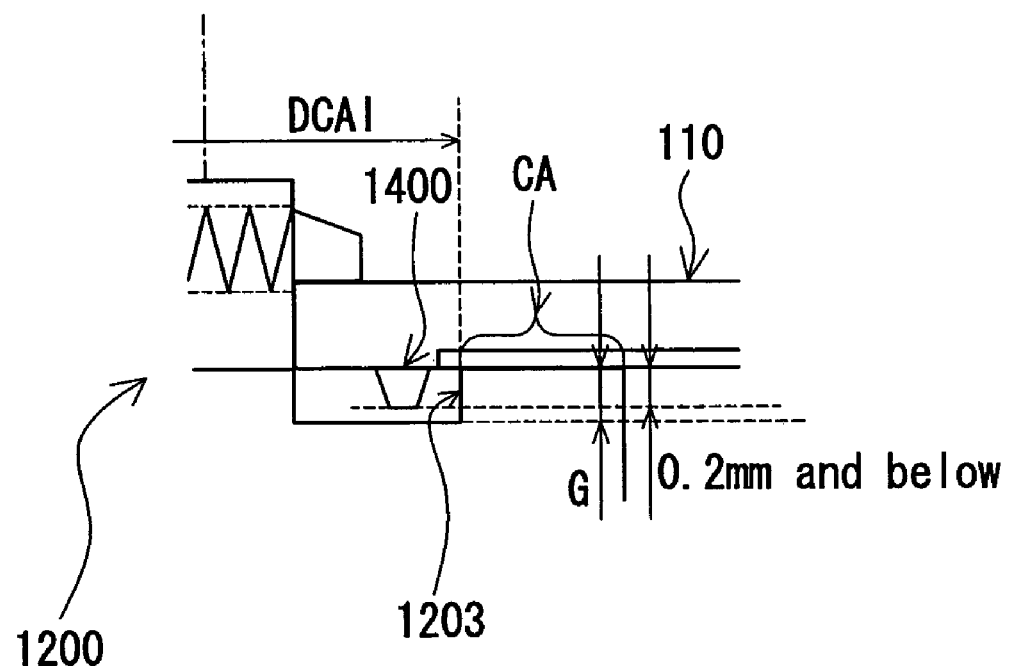
FIG. 15 is a partial section view showing an optical data recording medium having a smaller protrusion.

Furthermore, to prevent interference of the protrusion 1400 with the chucking surface 1203 and chuck 1200 better than the example shown in FIGS. 12A–12C, the protrusion 1400 can be disposed in a circumferential area having a 17.5 mm inside diameter and 21 mm outside diameter as shown in FIG. 15. If inside diameter $D_{CAI}$ is 22 mm in this case a gap of 0.5 mm in the radial direction is achieved between the protrusion and the clamping area CA.

Furthermore, if the disc is not greatly warped as shown in FIG. 13, the height of the protrusion 1400 from the surface of the clamping area CA can be 0.2 mm or less regardless of whether or not there is a step between the transparent protective layer surface and the clamping area. This still avoids interference between the protrusion 1400 and chucking surface 1203 and chuck 1200, enables the depth G of the chuck 1200 to be reduced to a shallow 0.25 mm, and provides greater freedom of design in the chuck 1200.

FIGS. 2A–2E show various examples of the sectional shape of the protrusion. As shown in FIGS. 2A–2E, the protrusion could be square (rectangular) 201, trapezoidal 202, elliptical 203, semi-circular 204, or triangular 205. It will also be obvious that the shape of this protrusion shall not be limited to shapes such as shown in FIGS. 2A–2E, and any shape whereby the protrusion projections above the surface of the transparent protective layer can be used.

Figure 3A:
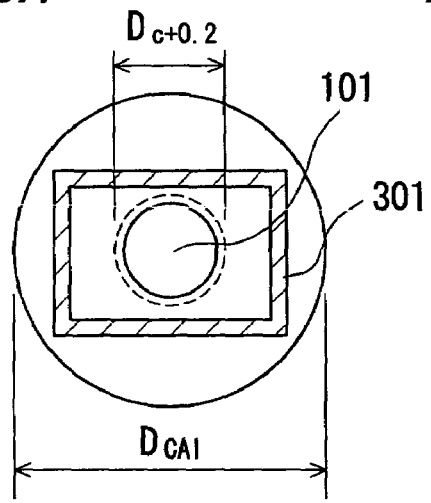
FIG. 3A to FIG. 3C show various configurations of the protrusion when seen in plan view from above the protrusion.
Figure 3B:
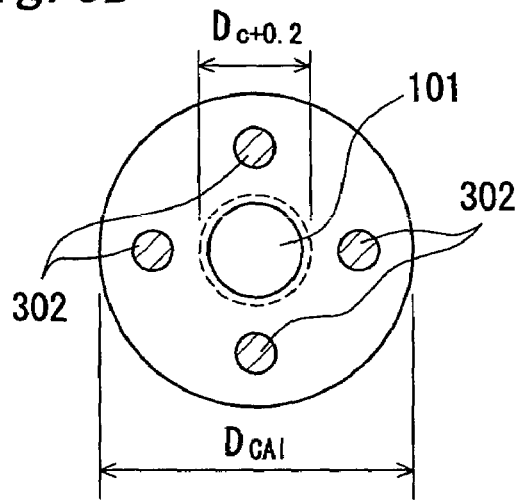
Figure 3C:
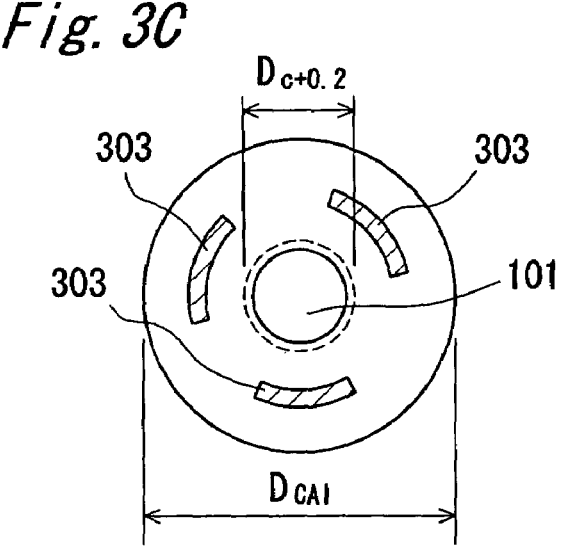

Examples of the shape of the protrusion when seen in a top view are shown in FIGS. 3A–3C. FIG. 3A shows a rectangular configuration, FIG. 3B shows a configuration having multiple discrete protrusions, and FIG. 3C shows a broken ring configuration. With the configuration shown in FIG. 3B there are four discrete dot-like protrusions 302 disposed at 90 degree intervals in the circumferential direction.

The broken ring configuration shown in FIG. 3C has three arc-shaped protrusions 303 disposed at 120 degree intervals in the circumferential direction on the same circular path.

When multiple discrete protrusions are disposed with a configuration such as shown in FIG. 3B or FIG. 3C, the number of protrusions shall not be so limited.

Furthermore, the shape of the protrusion(s) when seen in plan view shall not be limited to those shown in FIGS. 3A–3C. More specifically, the protrusion(s) can be shaped as desired insofar as they project out from the surface of the transparent protective layer and are located in a circumferential region with an inside diameter of $(D_C+0.2)$ mm and an outside diameter of $D_{CAI}$.

Figure 4:
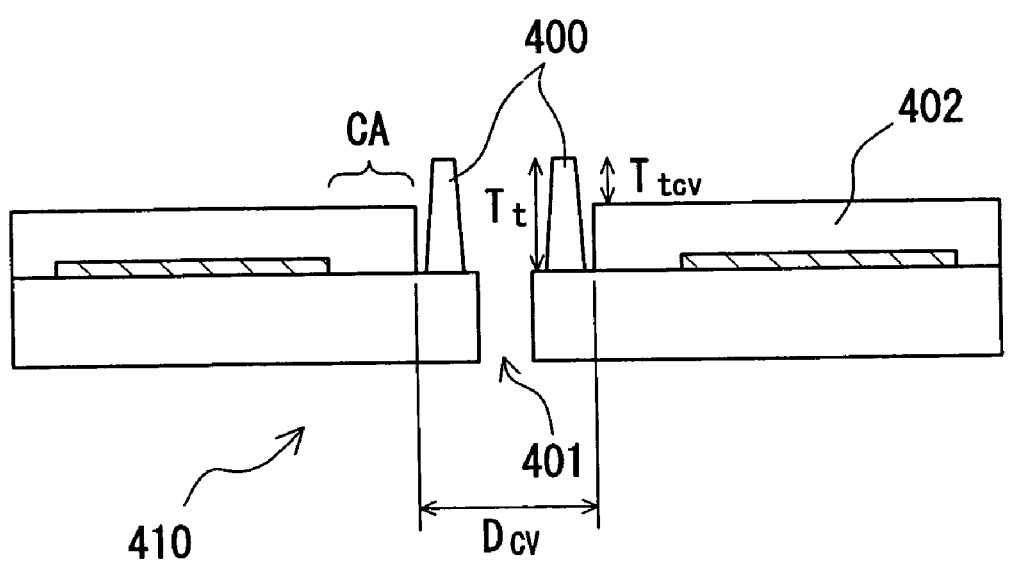
FIG. 4 is a section view of another optical data recording medium in which the configuration of the area from the spindle hole to the clamping area differs from that shown in FIGS. 1A and 1B.

FIG. 4 shows an example of an optical data recording medium 410 in which the configuration from the spindle hole to the clamping area differs from the configuration shown in FIGS. 1A and 1B. This disc differs from that shown in FIGS. 1A and 1B in that the transparent protective layer 402 also covers the clamping area CA but is absent around the spindle hole 401. The inside diameter $D_{CV}$ of the transparent protective layer 402 is therefore $D_{CV} \leq D_{CAI}$. The protrusion 400 is located between the spindle hole 401 and the inside diameter of clamping area CA. The total height $T_t$ of the protrusion 400 is $$T_t = T_{tcv} + (\text{transparent protective layer thickness})$$

where $T_{tcv}$ is the height above the surface of the transparent protective layer 402. In this example $T_{tcv}$ is 0.1 mm to 0.5 mm.

It is also possible for the transparent protective layer to not be formed in the clamping area CA.

The effect of disposing a protrusion projecting from the surface of the transparent protective layer on the light incidence side of the area between the spindle hole and clamping area of the optical data recording medium is described next.

The protrusions cannot be disposed to any desired place on the optical disc, and more specifically must be disposed where there will be no contact between the protrusions and the optical head. With the optical data recording medium according to a first embodiment of the invention the protrusions are disposed in the area between the spindle hole and clamping area CA. When reading and/or writing data to the signal recording layer the optical head is always on the outside circumference side of the clamping area CA. As a result, there is no contact between the optical head and the protrusions, which are on the inside circumference side of the clamping area CA and separated from the optical head by the clamping area CA.

Figure 5A:
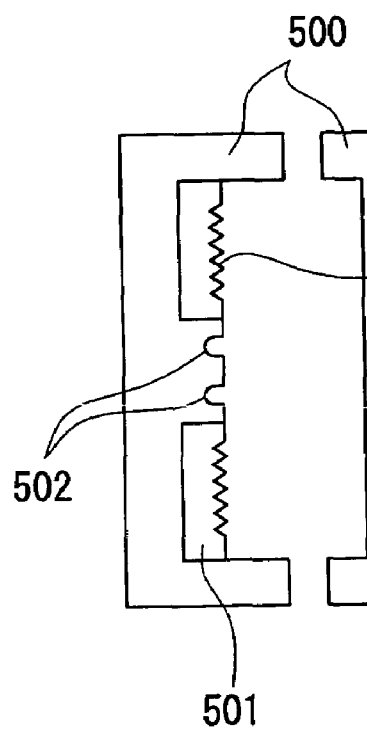
FIG. 5A to FIG. 5C are section views of a first method of manufacturing an optical data recording medium having a protrusion according to the present invention.
Figure 5B:
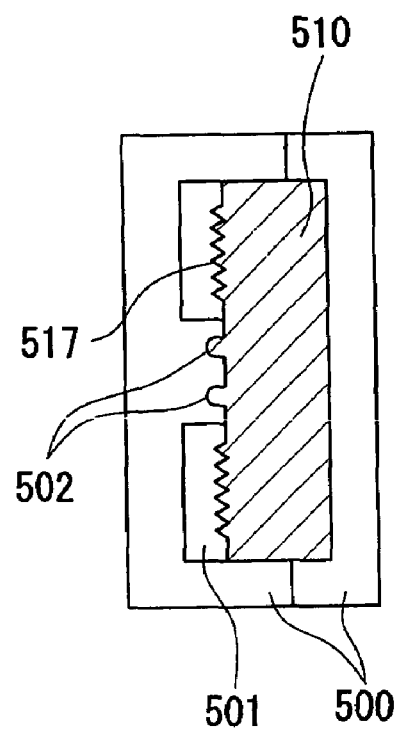
Figure 5C:
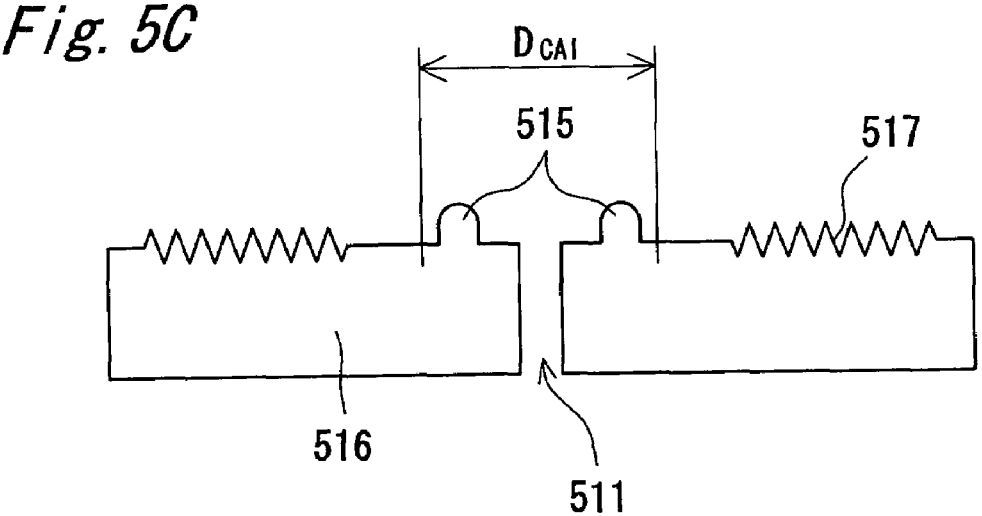

A method of manufacturing these protrusions according to the present invention is shown in FIGS. 5A–5C using by way of example an injection molding process.

A pair of dies 500 is prepared and a stamper 501 is set in one die as shown in FIG. 5A. This stamper 501 contains signal 517. The side of the dies 500 holding the stamper 501 also has cavities 502. These cavities 502 are formed to the desired shape of the protrusion.

The mold 500 is then closed as shown in FIG. 5B and molten resin 510 is injected. The molten resin 510 thus penetrates the signal 517 pattern and the cavities 502. The mold is then cooled and spindle hole 511 is stamped as shown in FIG. 5C to obtain a signal substrate 516 with signal 517 formed in the surface thereof. A signal recording layer is then formed over the signal 517 surface, and a transparent protective layer is formed as shown in FIG. 4. A transparent protective layer is formed from above the protrusion 515 to produce an optical data recording medium 110 as shown in FIGS. 1A and 1B. Because the transparent protective layer also accumulates on the protrusion 515, a protrusion with the same shape is also formed in the transparent protective layer.

Figure 6:
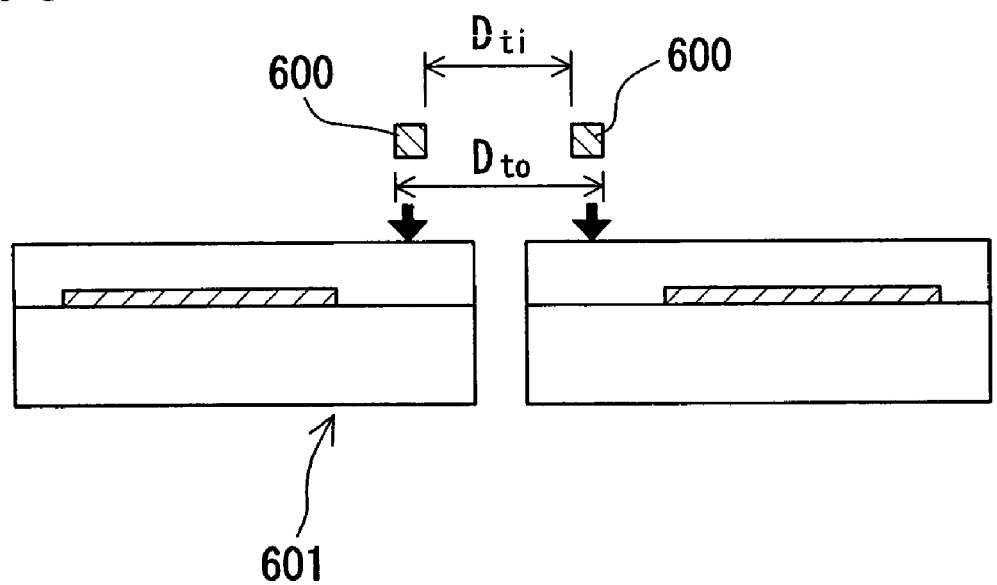
FIG. 6 shows a second method of manufacturing an optical data recording medium having a protrusion according to the present invention.

FIG. 6 shows a method in which parts having the desired shape of the protrusion are fixed to the disc surface with adhesive. In this case the desirably shaped protrusions 600 are bonded to the flat surface of the optical data recording medium 601, that is, a disc having no surface protrusions. A pressure-sensitive adhesive, UV-cured resin, or thermosetting resin, for example, could be used. The material used for the protrusions 600 is preferably lightweight, easy to handle, and low cost, and resin is therefore suitable.

The material for bonding the protrusions 600 can be precoated to the part of the protrusions 600 that will touch the protrusion-less disc 601. Alternatively, the part touching the protrusion-less disc 601 could be heated and melted for bonding. The protrusions 600 could even be metal. Using the method shown in FIG. 6, a flat optical data recording medium 601 having no protrusions could be manufactured in one process, parts forming the protrusions can be produced in a separate process to the desired shapes, and protrusions with a particular desired shape could then be bonded to the disc surface. This method offers wide design latitude.

Figure 7A:
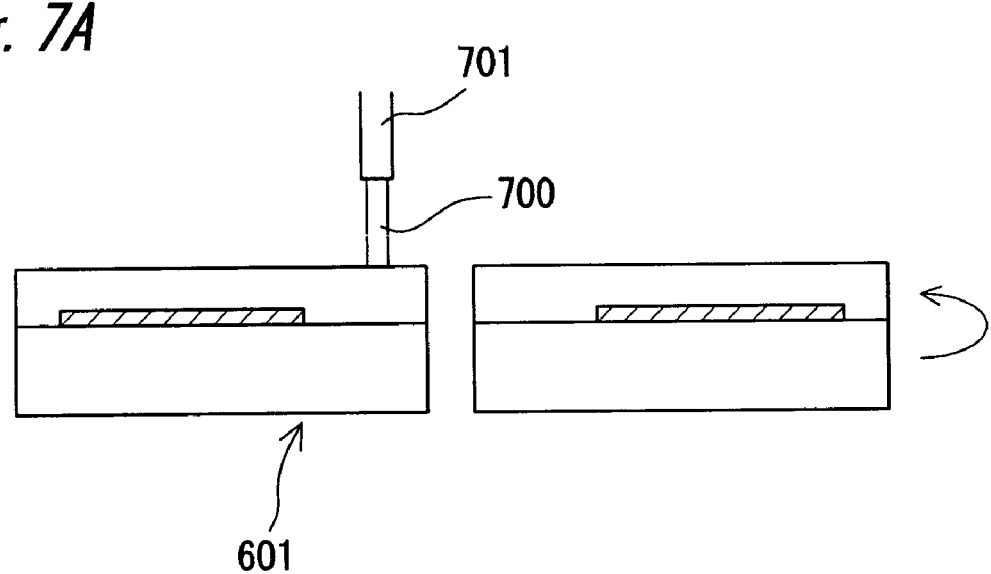
FIG. 7A and FIG. 7B show a third method of manufacturing an optical data recording medium having a protrusion according to the present invention.
Figure 7B:
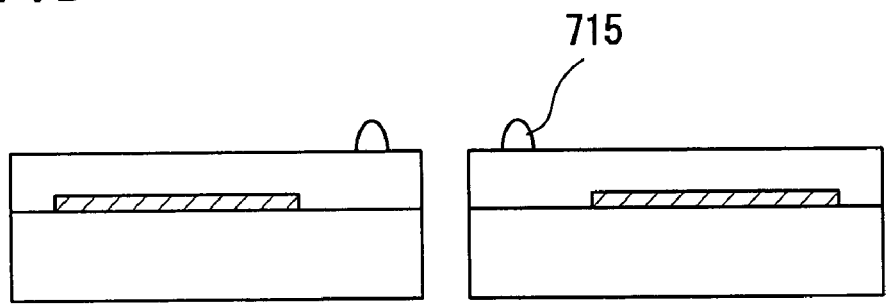

FIGS. 7A and 7B show a method in which drops of liquid resin are deposited and cured on the disc surface. As shown in FIG. 7A liquid resin 700 is dripped from a nozzle 701 to the desired locations on the protrusion-less disc 601. The protrusion-less disc 601 can rotated or moved, or the nozzle 701 could be moved, while dripping the resin. The liquid resin 700 in this case is preferably a UV-cured resin or thermosetting resin. Thus dripping and then curing the resin results in protrusions 715 of a desired configuration as shown in FIG. 7B. Using a disc such as shown in FIG. 4, the resin is dripped onto the signal substrate.

Protrusions can also be formed from a liquid resin using a screen printing process. In this case a printing screen is formed with the desired shape of the protrusions, and the liquid resin is screen-printed onto the disc surface. Because the method shown in FIGS. 7A and 7B does not require preparing and handling discrete protrusion parts, it can form the protrusions more economically than the process shown in FIG. 6.

As described above, an optical data recording medium according to this first embodiment of the invention has one or more protrusions located on the surface between the inside circumference of the clamping area CA and the outside edge of the spindle hole, assuring that the protrusions will not contact the optical head during recording or playback.

Furthermore, surface scratches can be prevented even when the disc is placed on a flat surface with the transparent protective layer side facing down because the protrusions assure that the transparent protective layer is sufficiently above and does not contact the flat surface.

Yet further, the proximity of the protrusions to the spindle hole minimizes the effect of any weight imbalance in the protrusion part. A stable, high quality signal can therefore be achieved.

Embodiment 2

Figure 8A:
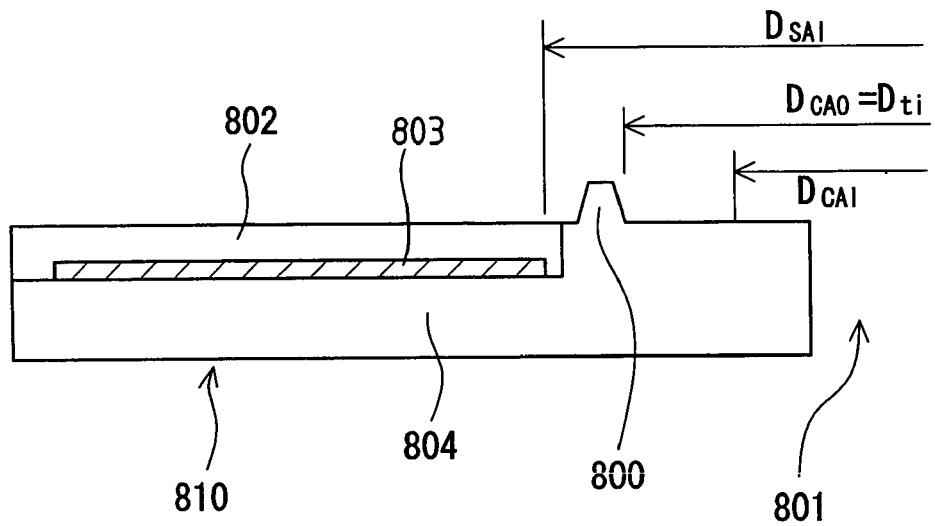
FIG. 8A is a partial section view of an optical data recording medium having a protrusion according to a second embodiment of the present invention.
Figure 8B:
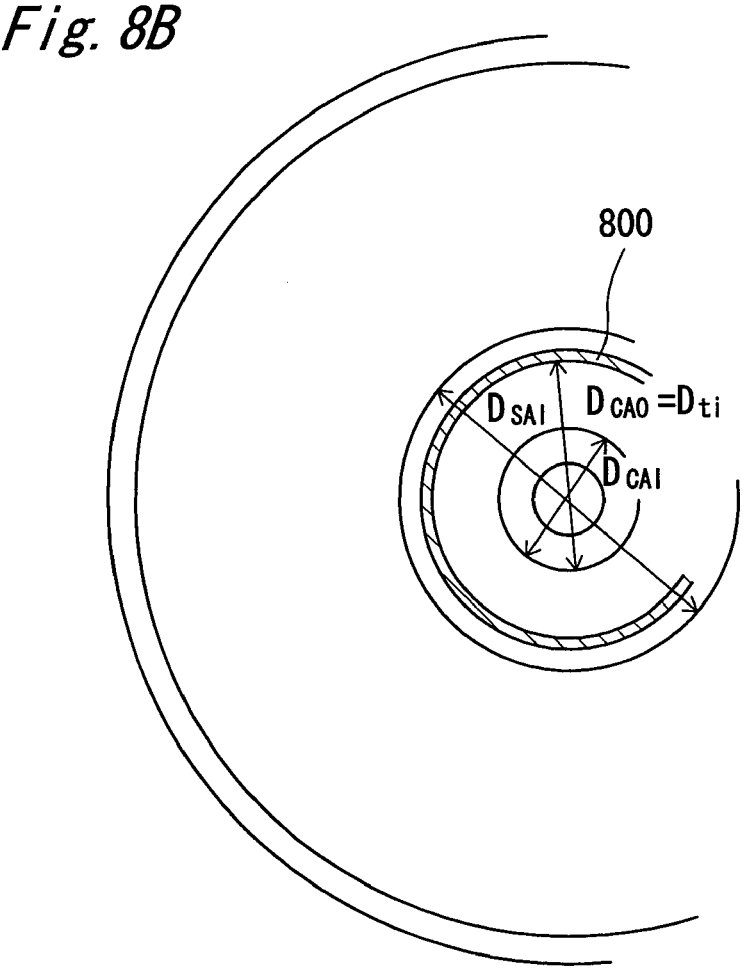
FIG. 8B is a partial plan view of the same optical disc.

FIGS. 8A and 8B show an optical data recording medium 810 having a protrusion 800 disposed in the area between the clamping area CA and signal area SA. FIG. 8A is a section view and FIG. 8B is a plan view from the transparent protective layer 802 side of the disc. The inside diameter and outside diameter of the clamping area CA and signal area SA are the same as in the first embodiment. The thickness of the transparent protective layer 802 is also the same as in the first embodiment. In this example the inside diameter $D_{ti}$ of protrusion 800 is 33 mm (=$D_{CAO}$), and the outside diameter $D_{to}$ is 35 mm. The height $T_{tcv}$, of the protrusion 800 is 0.25 mm. The protrusion 800 is formed on the surface of signal substrate 804.

Figure 9:
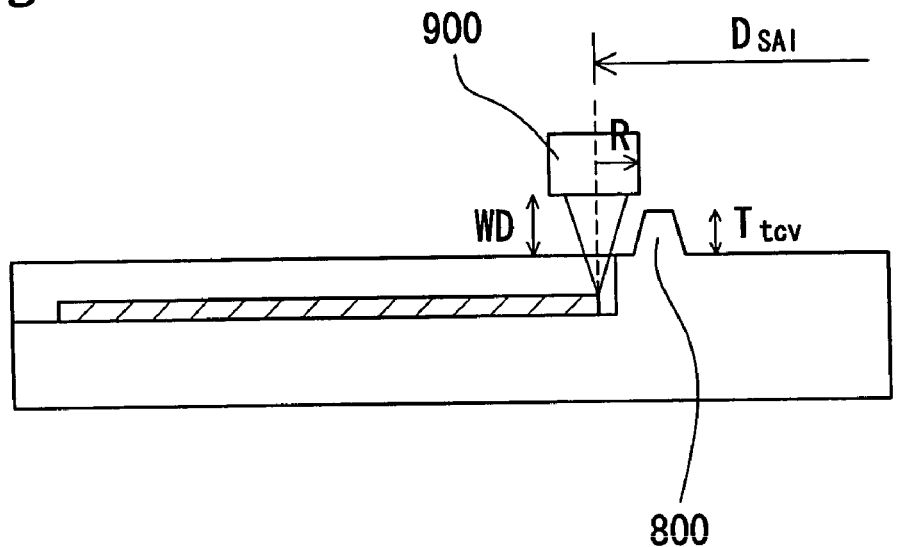
FIG. 9 is a partial section view showing reading and/or writing data to the data recording layer of an optical data recording medium having a protrusion according to a second embodiment of the invention.

FIG. 9 is a partial section view when reading and/or writing the optical disc.

When recording or playing a high density optical disc with a 0.1 mm thick transparent protective layer on the laser incidence side (the read/write side) of the disc using a 0.7 to 0.9 NA optical head, such as a high 0.85 NA optical head, the distance between the optical head and the high density optical disc, known as the working distance WD, is generally very small, typically 0.1 to 0.4 mm. A working distance WD of 0.4 mm or less is recommended, for example, in ISO M 2002 Technical Digest ThB.1 published by the International Symposium on Optical Memory.

Because of the short working distance WD in this case, the optical head can easily strike the transparent protective layer of the disc when the focusing servo is disrupted by such external factors as vibration of the disc surface. The high NA used with high density optical discs means that dust on the surface of the transparent protective layer can easily disrupt the focusing servo. When the focusing servo is off track, the optical head can easily collide with the protrusion on the disc surface. To prevent this, a shield for protecting the lens is required on the surface of the optical head. The thickness of this shield (approximately 0.1 mm) further decreases the working distance to 0.3 mm or less. If the working distance of the optical head increases, the outside diameter of the lens also increases. The outside diameter f of a lens with a 0.4 mm working distance is 6 mm to 8 mm (including the lens holder).

When reading and/or writing the signal area with inside diameter $D_{SAI}$ as shown in FIG. 9, the lens holder 900 intrudes on the area between clamping area CA and signal area SA by an amount equal to the radius R part of the lens holder 900. With a 0.85 NA, for example, the actual working distance WD of the lens is a narrow 0.2 mm to 0.3 mm. That is, with an optical data recording medium as shown in FIGS. 8A and 8B, the optimal height $T_{tcv}$ of the protrusion will differ according to the location of the protrusion.

The height $T_{tcv}$ of this protrusion 800 is considered next.

The closer protrusion 800 gets to inside diameter $D_{SAI}$, the closer protrusion 800 gets to the lens holder 900. The height $T_{tcv}$, must therefore be lowered. Furthermore, because the outside diameter $D_{to}$ of protrusion 800 is 35 mm, there is 3.5 mm to inside diameter $D_{SAI}$ (=42 mm). If the actual working distance WD of the lens is 0.2 mm, there is 0.5 mm of space between the lens holder 900 and protrusion 800 because the radius R of the lens holder is approximately 3 mm. Radius R is approximately 4 mm if the working distance WD is 0.3 mm, but because height $T_{tcv}$ is 0.25 mm, the protrusion 800 will not collide with the lens holder 900.

It is thus necessary to consider the working distance WD of the lens when the protrusion is located in the area between clamping area CA and signal area SA. However, if the height $T_{tcv}$ of the protrusion is 0.1 m to 0.3 mm, the protrusion 800 will not collide with the lens holder 900.

It will also be obvious that the surface protection performance of the transparent protective layer is also achieved.

It should be noted that the protrusion can be located in the area between the clamping area CA and signal area SA as described in this second embodiment of the invention whether the transparent protective layer is not formed in the clamping area CA as shown in FIGS. 8A and 8B, or whether the area of the transparent protective layer is disposed to an area as shown in FIGS. 1A and 1B or FIG. 4.

Figure 10:
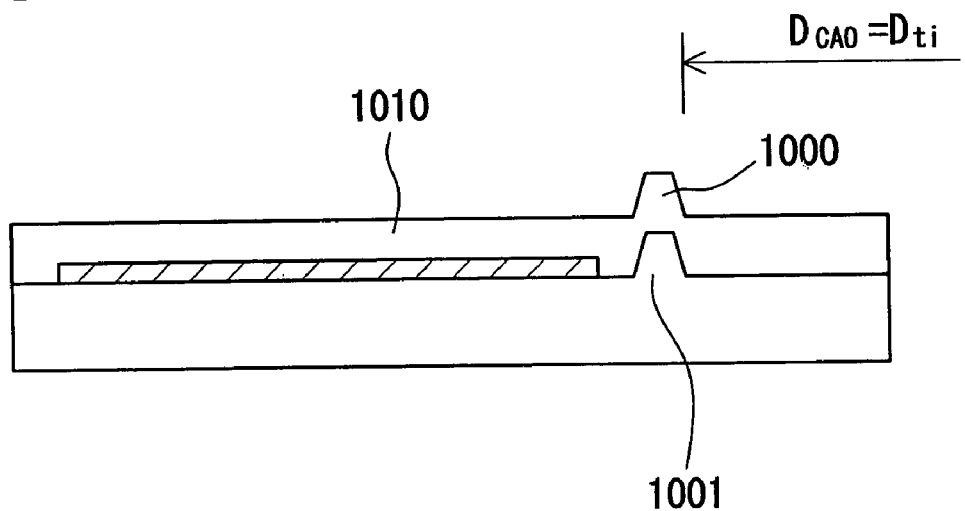
FIG. 10 shows an example of a method of forming the protrusion in a method for manufacturing an optical data recording medium according to the second embodiment of the invention.

The protrusion in this second embodiment can also be manufactured using the same materials and methods described in the first embodiment. Note that depending upon the inside diameter of the stamper, it may be necessary to provide a cavity in the stamper with the injection molding method shown in FIG. 5. For example, if the inside diameter of the stamper is less than 33 mm, the stamper thickness could be increased and a cavity of desirable depth and configuration formed in the stamper by etching or machining. As shown in FIG. 10, a protrusion 1001 can be formed on the signal substrate and the transparent protective layer 1010 formed thereon to form the surface protrusion 1000. The protrusion can also be formed on an optical data recording medium as shown in FIGS. 8A and 8B by a molding process such as shown in FIGS. 5A–5C.

The shape and configuration of the protrusion can be the same as described in the first embodiment above. When the protrusion is in an area between the clamping area CA and signal area SA as described in this second embodiment of the invention, and particularly when the protrusion is within 2 mm on the outside circumference side of the clamping area CA, collision of the optical head with the protrusion can be prevented during both recording and playback, and surface scratches can be prevented even when the optical data recording medium is placed on a flat surface with the transparent protective layer of the disc facing the flat surface because the protrusion assures that the surface of the disc does not contact the surface on which it is placed.

Embodiment 3

Figure 11A:
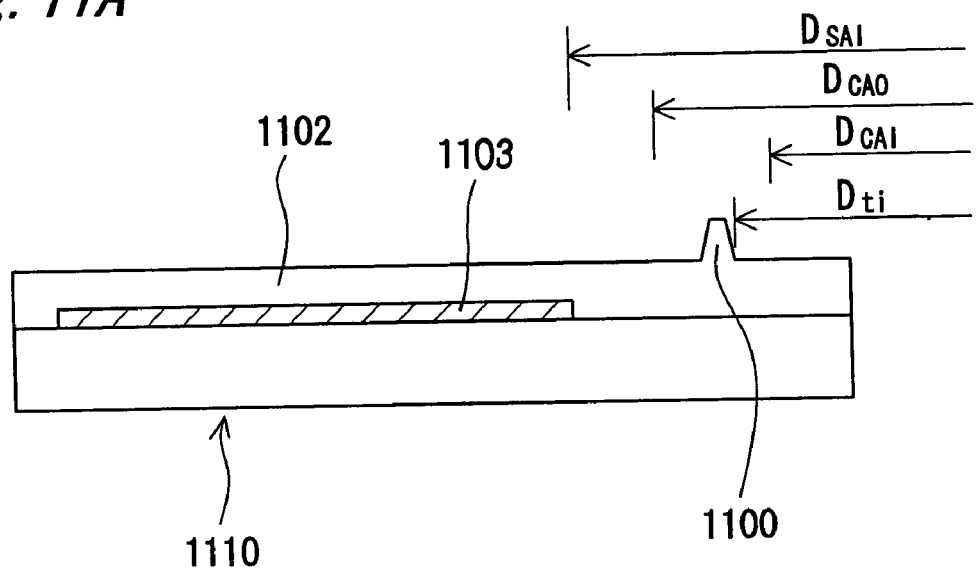
FIG. 11A to FIG. 11C are schematic section views showing methods of clamping an optical data recording medium having a protrusion according to a third embodiment of the invention.
Figure 11B:
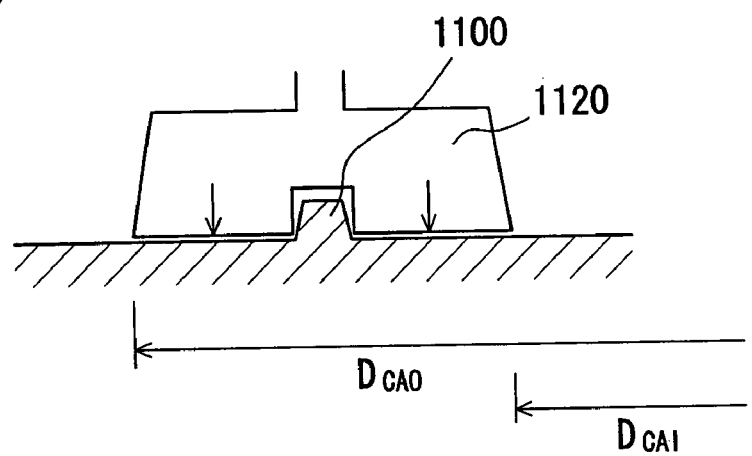
Figure 11C:
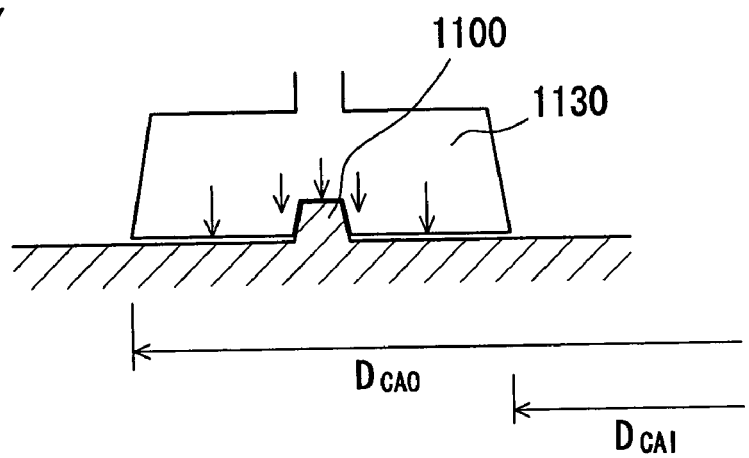

An optical data recording medium in which the protrusion is located in the clamping area CA is shown in FIGS. 11A–11C as a third embodiment of the present invention. FIG. 11A is a section view of the disc.

The inside diameter $D_{ti}$ and outside diameter $D_{to}$, of the protrusion 1100 are defined by the following relation.

$$D_{CAI}<=D_{ti}<D_{to}<=D_{CAO}$$

This configuration also prevents scratching when the optical data recording medium 1110 is placed on a flat surface with the transparent protective layer 1102 facing the flat surface because the protrusion assures a sufficient gap between the transparent protective layer 1102 and said flat surface.

Collision of the optical head with the protrusion is also prevented because the optical head does not enter the clamping area CA.

Note that the thickness of the transparent protective layer, inside diameter $D_{CAI}$, and outside diameter $D_{CAO}$ are the same in this embodiment as in the first embodiment.

The width of the protrusion 1100 and the height of the protrusion from the surface of the transparent protective layer 1102 are also the same as in the first embodiment, that is, in the ranges 0.2 mm to 1 mm, and 0.1 mm to 0.5 mm, respectively.

Unlike in the first and second embodiments, the disc drive clamps the optical data recording medium 1110 on both sides of the protrusion 1100 in this third embodiment. This is possible except when $D_{CAI}=D_{ti}$ or $D_{to}=D_{CAO}$. FIG. 11B and FIG. 11C show two different ways of clamping the optical data recording medium 1110 on both sides of the protrusion 1100.

In the example shown in FIG. 11B, the clamp 1120 applies pressure to the disc in the clamping area on both sides of the protrusion 1100. The disc can be held with sufficient force in this case despite the protrusion 1100 because the clamping member has a channel providing clearance for the protrusion 1100.

In the example shown in FIG. 11C, the clamp 1130 applies pressure to the disc in the clamping area on both sides of the protrusion 1100, and also applies pressure to the protrusion 1100. This method provides even more positive clamping of the disc because pressure is applied to a larger area of the disc than with the method shown in FIG. 11B.

The optical data recording medium can be held stable and rotated with sufficient pressure during both recording and playback to assure good signal quality and reliable recording and playback performance.

It should be noted that the disc is clamped on both sides of the protrusion 1100 in this embodiment, but it could be held only in the area between inside diameter $D_{CAI}$ and the inside circumference edge of the protrusion 1100, or the area between outside diameter $D_{CAO}$ and the outside circumference edge of the protrusion 1100.

While this third embodiment has been described with reference to the configuration shown in FIGS. 11A–11C, it could be configured as shown in FIG. 4 and FIG. 8. That is, this protrusion could be used on a disc in which the transparent protective layer is not formed in the clamping area CA, or on a disc in which the transparent protective layer is not in the clamping area CA and there is a step between the surface elevations of the signal substrate and the transparent protective layer.

The protrusion 1100 of this third embodiment can also be formed using the same materials and methods described in the first and second embodiments above.

The shape and configuration of the protrusion could also be as described in the first embodiment.

Figure 16:
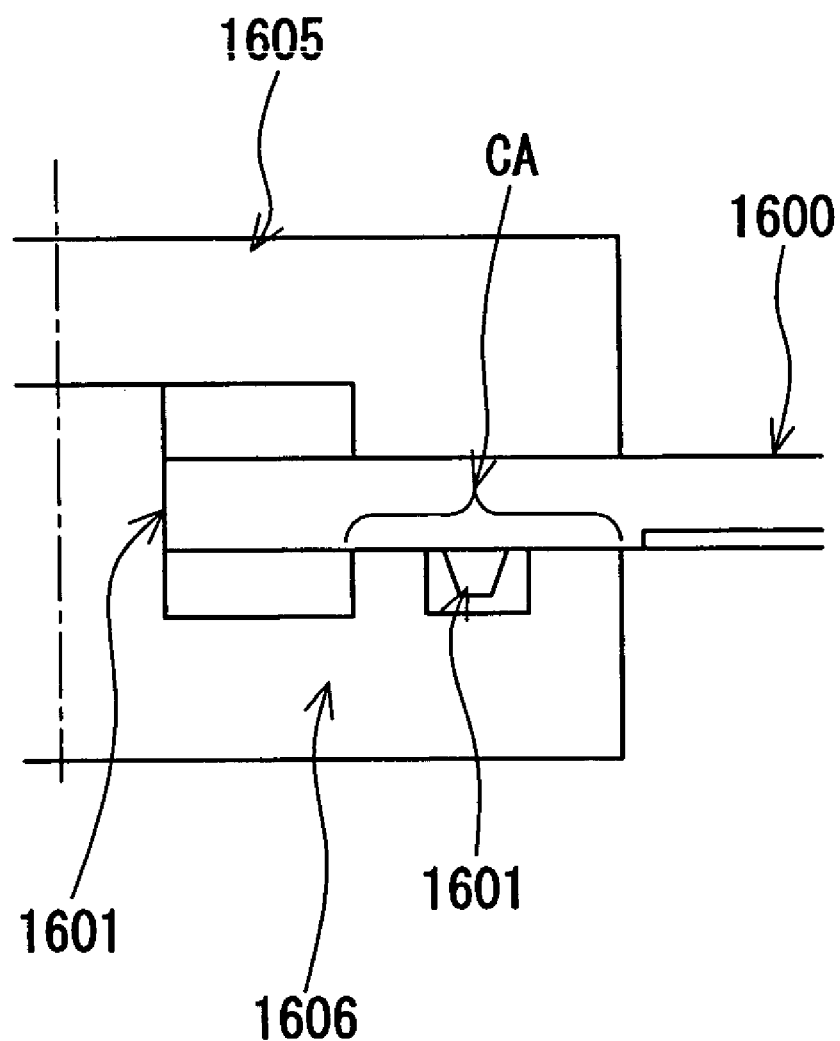
FIG. 16 is a partial section view showing the optical data recording medium of the third embodiment when clamped from both top and bottom sides of the disc.

Clamping an optical data recording medium according to the present invention shall not be limited to holding the disc with chucking jaws in the clamping area CA on only one side of the disc as shown in FIG. 12A to FIG. 12C and FIG. 15. More specifically, the optical data recording medium could be clamped from both sides of the disc. This is shown in FIG. 16, a section view of the optical data recording medium 1600 being clamped in the clamping area CA from above and below the disc by means of a top clamp 1605 and a bottom clamp 1606. In this example the protrusion 1601 is disposed in the clamping area CA, and the area on both sides of the protrusion 1601 is supported by bottom clamp 1606 on the laser-incidence side of the disc.

The material used to manufacture the signal substrate is not particularly discussed in the above-described embodiments, but is preferably a plastic such as polycarbonate, norbornene resin, or polyolefin resin.

The transparent protective layer can also be formed by applying a sheet film thinner than the desired thickness with adhesive, or applying a coat of liquid resin. When a thin sheet film is applied with adhesive, the adhesive could be a UV-cure resin, thermosetting resin, or pressure sensitive adhesive, for example.

When a coat of liquid resin is applied, the resin could be a UV-cure resin or thermosetting resin, for example.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. An optical disc with a center hole, the optical disc comprising:
    a signal substrate;
    a signal recording layer for storing data;
    a transparent protective layer having a 10 μm to 200 μm thickness disposed over said signal recording layer; and
    a protrusion projecting from a surface of said transparent protective layer, wherein
    a signal area of the optical disc is located over said signal recording layer,
    a clamping area of the optical disc is located between the signal area and the center hole, and
    said protrusion is disposed at an area of the optical disc between the center hole and the clamping area.

2. An optical disc according to claim 1, wherein said protrusion is disposed at least 0.1 mm in a radial direction from an outside edge of the center hole.

3. An optical disc according to claim 1, wherein
    the data is recorded to and read from said signal recording layer using an optical head with a 0.7 to 0.9 numeric aperture, and
    said protrusion projects to a height of 0.05 mm to 0.5 mm from said surface of said transparent protective layer.

4. An optical disc according to claim 3, wherein said protrusion projects to a height of 0.1 mm to 0.3 mm from said surface of said transparent protective layer.

5. An optical disc according to claim 1, wherein
    a diameter of the center hole is approximately 15 mm,
    said protrusion is disposed to the area between a 17.5 mm inside diameter and 22.0 mm outside diameter, and
    a height of said protrusion above said transparent protective layer surface is 0.3 mm or less.

6. An optical disc according to claim 5, wherein the height of said protrusion from a surface of the clamping area for holding the optical disc when reading or recording the data in said signal recording layer is 0.325 mm or less.

7. An optical disc according to claim 5, wherein the height of said protrusion from a surface of the clamping area for holding the optical disc when reading or recording the data in said signal recording layer is 0.275 mm or less.

8. An optical disc according to claim 5, wherein the height of said protrusion from a surface of the clamping area for holding the optical disc when reading or recording the data in said signal recording layer is 0.20 mm or less.

9. An optical disc according to claim 8, wherein said protrusion is disposed to the area between a 17.5 mm inside diameter and 21.0 mm outside diameter.

10. An optical disc according to claim 1, wherein a wavelength of light for recording and/or reading the data in said signal recording layer is 410 nm or less.

* * * * *